United States Patent
Hayzen et al.

(10) Patent No.: US 12,174,216 B2
(45) Date of Patent: Dec. 24, 2024

(54) DETERMINATION OF RPM BASED ON SCANNING VIBRATION SPECTRAL PLOT

(71) Applicant: Computational Systems, Inc., Knoxville, TN (US)

(72) Inventors: Anthony J. Hayzen, Knoxville, TN (US); Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 308 days.

(21) Appl. No.: 17/941,239

(22) Filed: Sep. 9, 2022

(65) Prior Publication Data

US 2023/0003756 A1  Jan. 5, 2023

Related U.S. Application Data

(62) Division of application No. 17/031,804, filed on Sep. 24, 2020, now Pat. No. 11,519,930, which is a division of application No. 15/946,403, filed on Apr. 5, 2018, now Pat. No. 10,823,749.

(51) Int. Cl.
    *G01P 3/48* (2006.01)
(52) U.S. Cl.
    CPC ................. *G01P 3/4802* (2013.01)
(58) Field of Classification Search
    CPC . G01H 1/003; G01M 1/22; G01P 3/44; G01P 3/48; G01P 3/4802
    See application file for complete search history.

(56) References Cited

U.S. PATENT DOCUMENTS

| 4,989,159 A | 1/1991 | Liszka et al. |
| 5,115,671 A | 5/1992 | Hicho |
| 5,744,723 A | 4/1998 | Piety |
| 2011/0290024 A1 | 12/2011 | Lefler |
| 2014/0116124 A1 | 5/2014 | Ma et al. |
| 2023/0027207 A1 | 1/2023 | Hayzen et al. |

FOREIGN PATENT DOCUMENTS

| DE | 102017104207 A1 | 9/2018 |
| EP | 1197415 A2 | 4/2002 |

OTHER PUBLICATIONS

Deutsches Patent—und Markenamt, Examination Report dated Jun. 27, 2024 for German Patent application 10 2019 106 903.3.

*Primary Examiner* — Kyle R Quigley
(74) *Attorney, Agent, or Firm* — Luedeka Neely, P.C.

(57) ABSTRACT

A vibration analyzer for use in determining a rotational speed. The vibration analyzer includes an input for sensing vibration data, a memory for storing the vibrational data, and a processor. The processor produces a spectral plot of the vibrational data, locates peaks in the spectral plot, receives an input rotational speed, and scans the spectral plot in predetermined rotational speed increments to provide a candidate rotational speeds. For each candidate rotational speed, a number of associated harmonics is identified, closest peaks in the spectral plot to the candidate rotational speed and its harmonics are located, gaps between the closest peaks and the candidate rotational speed and its harmonics are measured and summed, and a sum of the gaps is recorded. The candidate rotational speed that is associated with the maximum peak sum is selected as the nominal rotational speed.

5 Claims, 5 Drawing Sheets

DETERMINATION OF RPM BASED ON SCANNING VIBRATION SPECTRAL PLOT

RELATED APPLICATIONS

This application claims priority as a divisional of pending U.S. patent application Ser. No. 17/031,804, filed Sep. 24, 2020, titled DETERMINATION OF RPM FROM VIBRATION SPECTRAL PLOTS, which is a divisional of U.S. patent application Ser. No. 15/946,403, filed Apr. 5, 2018, titled DETERMINATION OF RPM FROM VIBRATION SPECTRAL PLOTS, which granted on Nov. 3, 2020, as U.S. Pat. No. 10,823,749, the disclosures of which are incorporated herein in their entirety.

TECHNICAL FIELD

The disclosure relates to the apparatus for the determination of rotational speed for a machine, and more particularly to analytical instruments for determining rotational speed using vibration analysis in the absence of actual rotational speed measurements.

BACKGROUND OF THE INVENTION

Rotating equipment, such as fans, motors, turbines, and the like, tend to lose their balance or alignment with time due to conditions such as wear, varying load, damage, misuse, and foreign matter accumulation. As balance and alignment are lost, the equipment produces excessive vibration, which if left uncorrected, causes accelerated wear and other damage to the equipment.

Vibration analyzers detect the vibration emitted from rotating equipment. Such analyzers determine the source of the vibration, whether it be unbalance, misalignment, worn bearings, missing or broken parts, or some other problem. To make a proper diagnosis of the vibration problem, the rotational speed of the shaft must be known. However, the rotational speed is not often known at the time of data collection. Therefore, the rotational speed must be calculated from the vibration spectrum.

Correlation of the rotational speed of the shaft in the vibration spectrum is required for problem diagnosis because there are often many different potential sources of vibration, each of which creates a different vibration signature. One of the first determinations to be made is whether the vibration detected is synchronous or asynchronous with the rotation of the equipment. If asynchronous, an analysis is made to determine if the vibration can be correlated in some other way to the rotational speed of the equipment. In this manner, specific problems are isolated and corrected.

For example, in a piece of rotary equipment such as a turbine, vibration that is synchronous with the first harmonic of the rotation speed indicates rotor unbalance, for which there are well defined methods of correction. Knowing the rotational speed of the turbine allows for a speedy diagnosis of this problem, and reduces time wasted on investigation of unrelated potential vibration sources.

As another example, a defective anti-friction bearing produces vibration that has a fixed, but non-integer relationship to the speed of the shaft. Thus the vibration is not a harmonic of the rotational speed of shaft. However, with a knowledge of the bearing parameters, such as the inner and outer raced fault frequencies, the vibration produced by the defective bearing is correlated with the speed of the shaft, and the problem is diagnosed and corrected. Again, without knowledge of the speed of the shaft, the defective bearing is more difficult to diagnose.

Further, in a piece of rotary equipment such as a gear box, which may have several gears of different sizes, a problem such as a cracked tooth on one of the gears creates vibration that is synchronous with the rotational speed of a shaft. Correlating the speed of rotation, the known number of teeth on each gear, and the vibration spectrum allows the damaged gear to be diagnosed.

In each case, the diagnosis of the source of vibration is made easier if the rotational speed of the equipment is known. The actual correlation of the rotational speed to the vibration spectrum, and the analysis of the correlated information, is performed either by the technician, or automatically by the vibration detection instrument, if it has such capability.

The problem is that without use of a tachometer to measure the rotational speed it is difficult to determine the rotational speed accurately. In many cases, the rotational speed is either assumed to be the default assigned when the machine was configured or is manually entered when data is collected using a portable analyzer. In such situations, the rotational speed is at best an approximation. As the load on the machine varies, the actual rotational speed may also vary. Thus the assumed rotational speed may be completely incorrect due to manual data entry errors. What is needed, therefore, is an apparatus that can be used to determine the rotational speed of a machine when a tachometer and actual rotational speed data are unavailable.

SUMMARY OF THE INVENTION

In view of the foregoing, a first aspect of the invention is a vibration analyzer for use in determining a nominal rotational speed of a rotating shaft. The vibration analyzer includes: a) an input for sensing vibration signal data at an unknown rotational speed of the shaft, b) a memory for storing the vibrational signal data, and c) a processor. The processor 1) produces a spectral plot of the vibrational data, 2) locates peaks in the spectral plot, 3) inputs a rotational speed, and 4) scans the spectral plot in predetermined rotational speed increments beginning at a first rotational speed and ending at a second rotational speed to provide a candidate rotational speed at each increment. For each candidate rotational speed i) a predetermined number of associated harmonics is identified, ii) closest peaks in the spectral plot to the candidate rotational speed and its associated harmonics are located, iii) gaps between the closest peaks and the candidate rotational speed and its associated harmonics are measured, iv) the gaps in association with the candidate rotational speed are summed, and a sum of the gaps is recorded. In step (5) The candidate rotational speed that is associated with a minimum sum in step (iv) is then selected as the nominal rotational speed.

In a second aspect of the invention, there is provided a vibration analyzer for use in determining a nominal rotational speed of a rotating shaft. The vibration analyzer includes: a) an input for sensing vibration signal data at an unknown rotational speed of the shaft, b) a memory for storing the vibrational signal data, and c) a processor. The processor 1) produces a spectral plot of the vibrational data, 2) locates peaks in the spectral plot, and 3) scans the spectral plot in predetermined rotational speed increments beginning at a first rotational speed and ending at a second rotational speed to provide a candidate rotational speed at each increment. For each candidate rotational speed: i) a predetermined number of associated harmonics is identified, ii) closest peaks in the spectral plot to the candidate rotational speed and its associated harmonics are located, iii) gaps are measured, and iv) the sum of the gaps is recorded. Next, (4) the sums of the gaps that represent local minimum gaps are identified, (5) peak sums associated with the local minimum gaps in step (4) are located, and 6) the candidate rotational speed that is associated with the maximum peak sum in step (5) is selected as the nominal rotational speed.

In a third aspect of the invention, there is provided a vibration analyzer for use in determining a nominal rotational speed of a rotating shaft. The vibration analyzer has an input for sensing vibration signal data at an unknown rotational speed of the shaft, a memory for storing the vibrational signal data, and a processor. The processor produces a spectral plot of peaks in the vibrational data; receives an estimated rotational speed; receives an accuracy value; identifies a predetermined number (k) of largest peaks in the spectral plot; and records a located amplitude and associated frequency for each peak. A set of candidate rotational speeds is created by dividing the located frequencies of each of the largest peaks by integer values of 1 through N, where N is a maximum number of harmonics evaluated to calculate the rotational speed, to produce divided values for each of the located frequencies. When a given one of the divided values is within the accuracy value of the estimated rotational speed, the given divided value is designated as a candidate rotational speed, where each candidate frequency represents a harmonic family. A score is provided for each candidate rotational speed based on a proximity of the candidate rotational speed and harmonic multiples of the candidate rotational speed to each of the largest peaks. The candidate rotational speed with the highest score is selected as the nominal rotational speed.

In some aspects, the input rotational speed or estimated rotational speed is a nameplate rotational speed of the machine.

In other aspects, the first rotational speed is about 50 percent of the input rotational speed and the second rotational speed is about 150 percent of the input rotational speed. In some aspects the first rotational speed is a rotational speed adjacent a beginning of the spectral plot and the second rotational speed ranges from about ⅕ to about 1/10 of a total rotational speed range of the spectral plot.

In some aspects, the input for sensing a vibration signal is a vibration sensor.

In other aspects, the predetermined rotational speed increments range from about 1/10 to about 1/100 of the input rotational speed. In some aspects, the predetermined rotational speed increments range from about 1/10 to about 1/100 of a span of the rotational speeds from the first rotational speed to the second rotational speed.

In the first aspect, a reasonable starting point for the turning speed is identified in the harmonic spectrum. The starting point can come from the customer or the literature. The spectrum is scanned in increments of about 1% of the starting point, beginning at about 50% of the starting point and ending at about 150% of the starting point. The range and increment is user-adjustable in some embodiments.

In some aspects, the candidate rotational speed is scored by summing a gap between each candidate rotational speed and each of the largest peaks and between each harmonic multiple of the candidate rotational speed and each of the largest peaks.

In other aspects, the accuracy value ranges from about 0.5 percent to about 2 percent.

In still other aspects, the predetermined number of largest peaks in the spectral plot ranges from 1 to K, wherein K is less than or equal to LOR/4, wherein LOR is lines of resolution of the spectral plot.

In other aspects, N typically ranges from about 6 to about 10. The value of N can be as large as the number of teeth on a gear of a gearbox. The value of N may be an integer value as large as Fmax/(estimated speed) wherein "Fmax" is a maximum frequency.

Accordingly, by using the apparatus described herein a user may be able to either improve the accuracy of the assumed rotational speed by scanning across the vibrational spectral peaks or, if this does not reflect a reasonable rotational speed, then to scan across all the spectral peaks to determine the most likely rotational speed.

BRIEF DESCRIPTION OF THE DRAWINGS

The present invention may best be understood by reference to a detailed description of preferred embodiments when considered in conjunction with the following drawings, in which.

DETAILED DESCRIPTION OF THE INVENTION

The above and other needs are met by an apparatus for use in determining the rotational speed of a machine, such as a shaft of a pump, motor, turbine, compressor, gear box, and the like using vibrational data. Such apparatus, as described in more detail below, may be used in the absence of a tachometer or nameplate information about the rotational speed of the machine.

Vibration analyzers are useful to sense, analyze, and record vibration in rotating equipment, which vibration can, if left uncorrected, degrade the efficiency of, or even destroy the rotating equipment. Preferably, a portable or hand-held analyzer is used to collect and analyze vibration data, which may also be uploaded and stored in a base computer for further analysis. Aspects of the invention are not limited to portable or hand-held vibration analyzers, as continuous or on-line analyzers may also be used to collect vibration data as well as vibration analysis software programs used in post-acquisition analysis of vibration data.

Figure 1:
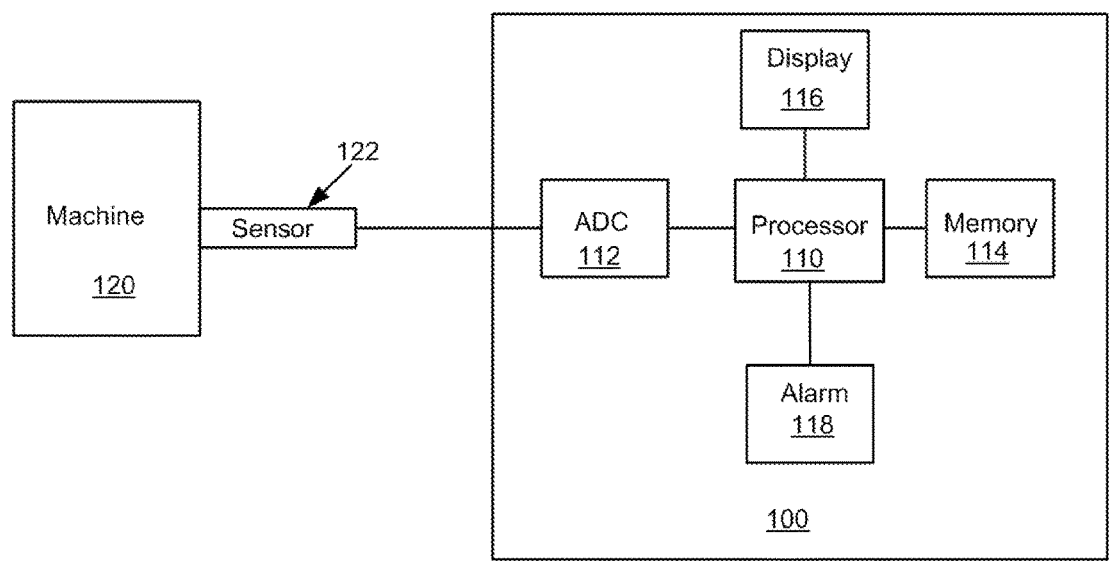
FIG. 1 is a schematic illustration of a vibration analyzer according to embodiments of the disclosure.

As shown in FIG. 1, a schematic drawing of a vibration analyzer 100, according to aspects of the invention, includes a processor 110, an analog to digital converter 112, a memory 114, a display device 116, and an alarm device 118. Vibration data from a machine 120 is detected by a vibration sensor 122 for input to the vibration analyzer 100 by means of an analog to digital converter 112. The vibration data is stored in the memory 114 and spectral plots of the data are generated by the processor 110 for use in deriving the rotational speed of the machine 120. Once the rotational speed of the machine is determined, the vibration data may be used to determine the source of the vibration so that the vibration can be corrected before damage occurs.

Figure 2:
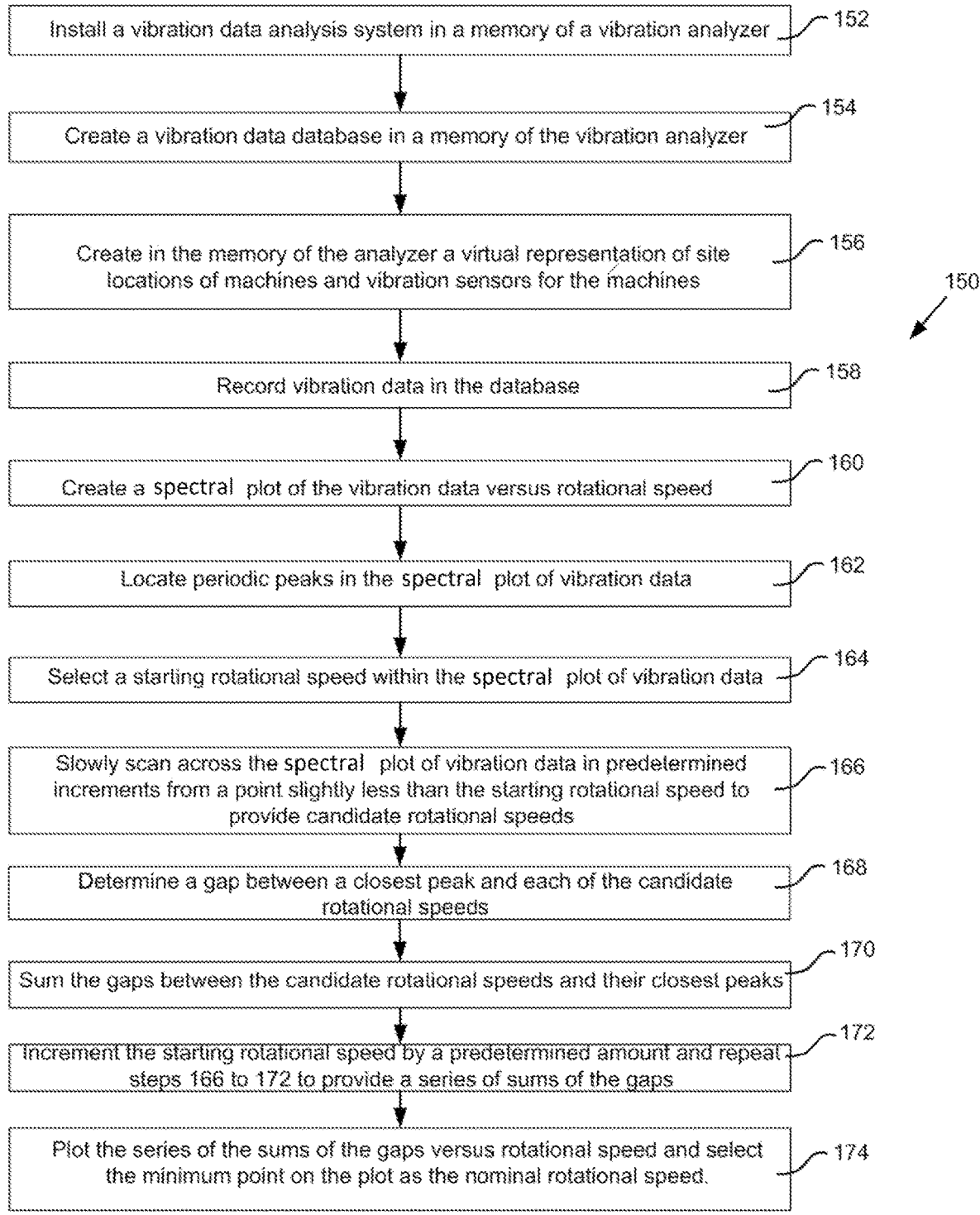
FIG. 2 is a block diagram of steps of collecting and using vibrational data using an apparatus according to a first aspect of the invention.
Figure 3:
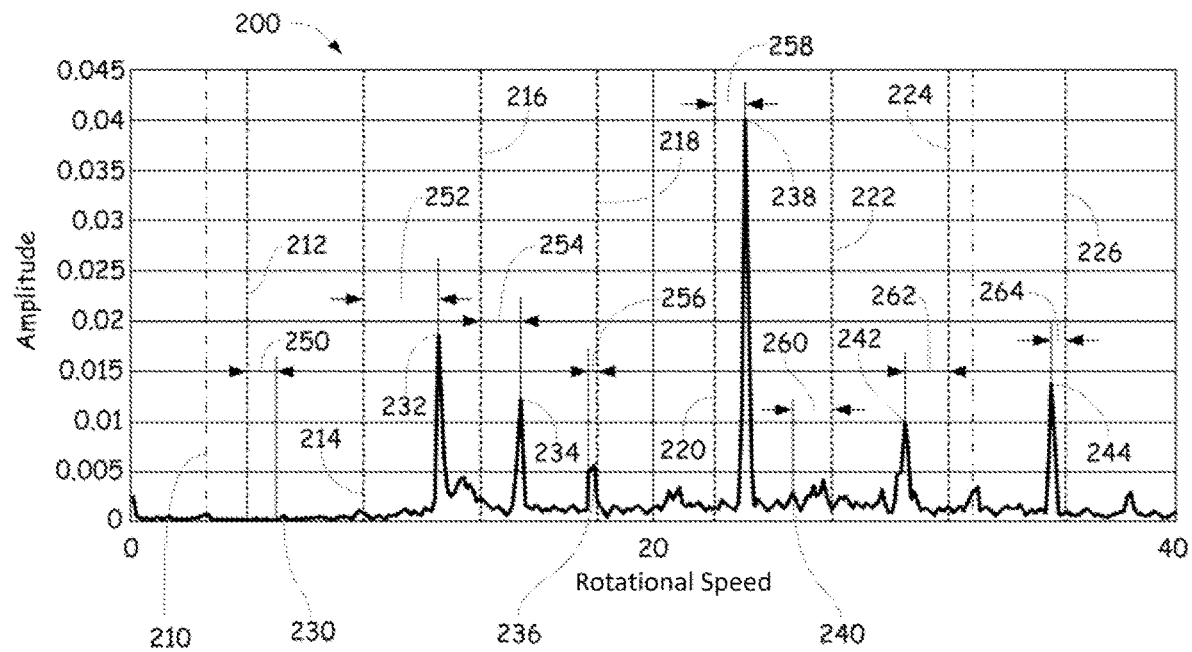
FIG. 3 is a graph of peaks in a spectral plot versus rotational speed for the apparatus according to the first aspect of the invention.
Figure 4:
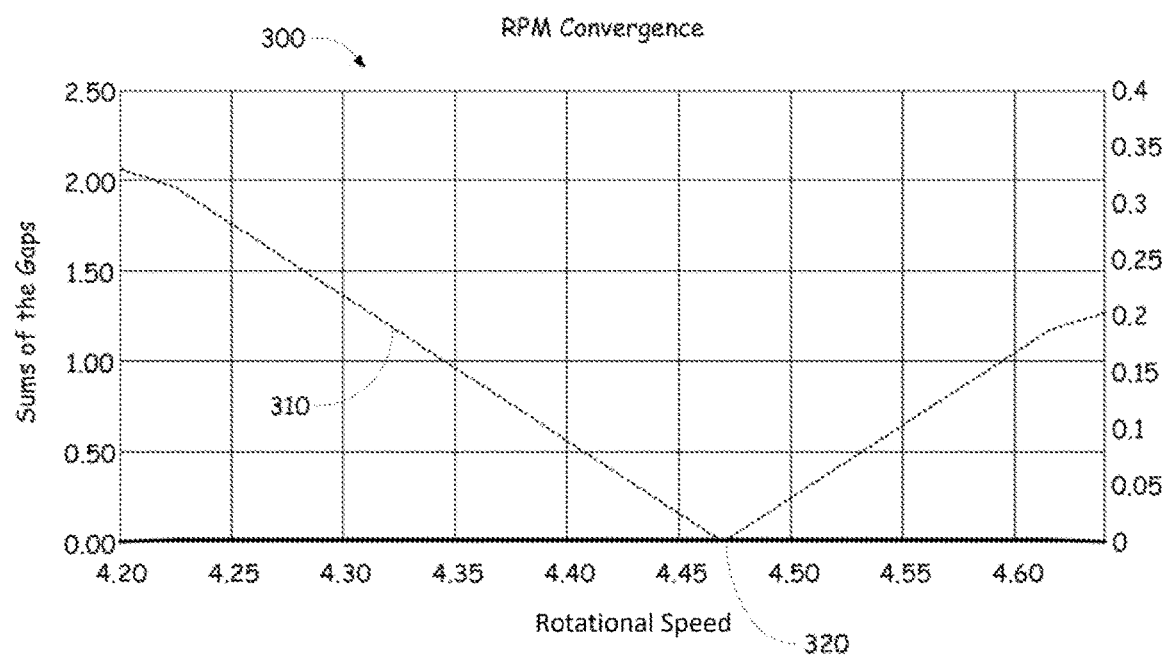
FIG. 4 is a plot of a sum of gaps between peaks and rotational speeds versus rotational speed showing a nominal rotational speed as a minimum sum according to the first aspect of the invention.

The first aspect of the invention is illustrated by references to FIGS. 2-4. FIG. 2 is a block diagram of a procedure 150 for determining rotational speed, and FIG. 3 is a spectral plot 200 of vibration data generated by the processor 110. With reference to FIG. 2, a vibration data analysis system is installed in step 152 on the vibration analyzer 100. A vibration data database is stored in the memory 114 of the analyzer 100 in step 154, and a representation of machine 120 locations and vibration sensors 122 is created in the analyzer memory 114 in step 156. Vibration data for the machine 120 is recorded in the database in step 158 using the sensors 122. Using the recorded data, a spectral plot 200 of the data is created in step 160 as shown in FIG. 3. In the spectral plot 200, the y-axis represents an amplitude of peaks in the plot 200 and the x-axis represents a frequency in cycles per second or a rotational speed in revolutions per minute. It will be appreciated that a frequency may be converted to revolutions per minute and vice versa. Peaks in the spectral plot 200 are located by any conventional peak location method in step 162. For example, peaks may be located by interpolation, summation, or fitting techniques known to those skilled in the art. Each peak in FIG. 3 has associated with it an amplitude (ie., acceleration, velocity, or displacement), or in other words, the energy present in the movement of the rotating equipment occurring at that specific frequency.

According to the first aspect of the invention, a starting rotational speed 210 is input by a user in step 164. The starting rotational speed 210 may be selected based on a published rotational speed for the machine 120 or an assumed rotational speed based on comparable machines 120. Next, the spectral plot 200 is scanned in step 166 in predetermined increments from a point that is slightly less than the starting rotational speed 210 to provide a candidate rotational speed 212. The candidate rotational speed 212 is incremented across the spectrum by a predetermined amount to get multiple candidate rotational speeds 214-226. For example if a total of 6 to 10 candidate rotational speeds across the spectrum are selected, the candidate rotational speeds will be incremented by ⅙ to 1/10 of the total rotational speed span across the spectrum.

Next, peaks 230-244 of the spectrum closest to each of the candidate rotational speeds are identified. The closest peaks may be at rotational speeds that are higher or lower than each of the candidate rotational speeds. The distances between the peaks and the candidate rotational speeds are determined and are defined as gaps 250-264 between the peaks 230-244 and the candidate rotation speeds 214-226. Then the harmonics of the closest peaks are calculated, and the rotational speed candidates of the closest peaks to each of those calculated harmonics of the rotational speed candidates are identified in step 172. Once again, the gaps between the rotational speed candidates of the calculated harmonics and their closest peaks are recorded. In some embodiments, eight calculated harmonics are used, and in other embodiments the number of harmonics is user-definable. For each set of candidate rotational speeds and their harmonics, the total of the gaps 250-264 is calculated in step 170, stored in the memory 114. The sum of the gaps 250-264 for each set of candidate rotational speeds and their harmonics is plotted versus rotational speed to provide a vee-shaped line having a minimum. FIG. 4 illustrates a plot 300 of the sums of the gaps for each increment of the starting rotational speed. As the candidate rotational speeds increase as shown by line 310, the sums of the gaps decrease, reach a minimum at point 320 and then increase. Point 320 (FIG. 4) is selected as the nominal rotational speed of the machine 120.

In some situations, the input rotational speed may be far removed from the actual rotational speed due to, for example input errors. According to the second aspect of the invention, there is no reasonable starting point for the turning speed, in which case there is no basis for the starting and ending points for the scan described in the first aspect of the invention. In this aspect of the invention, the scan points start near zero rotational speed, and extends up to about ⅛th of the total harmonic spectrum. Turning speed candidates are identified within this range as given in the first aspect of the invention, and sums of the gaps for the candidate rotational speeds are calculated.

Figure 6:
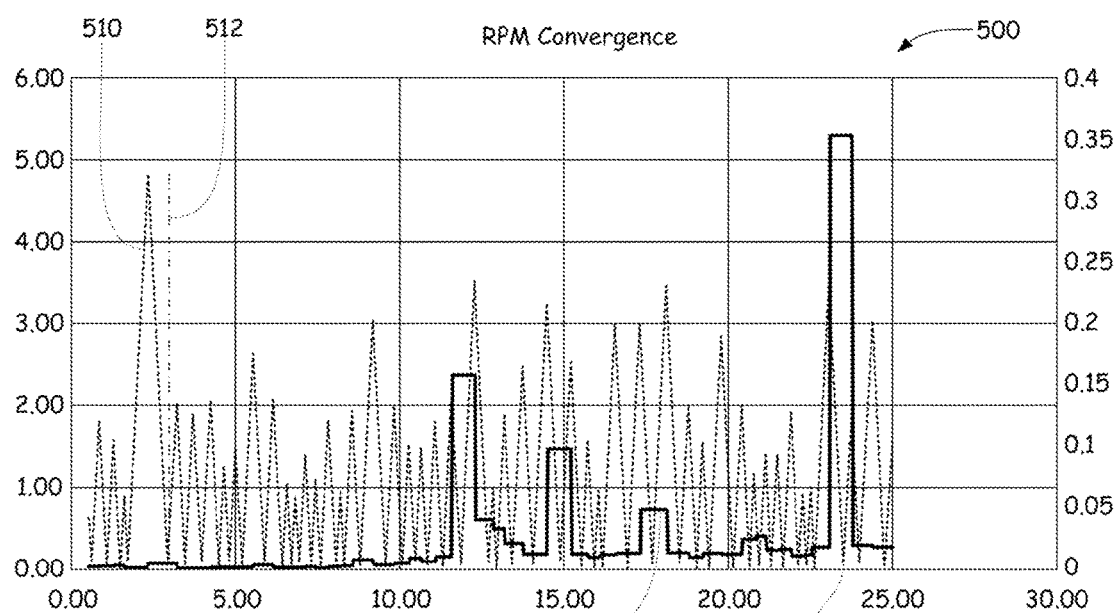
FIG. 6 is a graph of vibrational data using an apparatus according to a second aspect of the invention to find a nominal rotational speed from a sum of minimum gaps between a candidate rotational speed and its closest peak.
Figure 5:
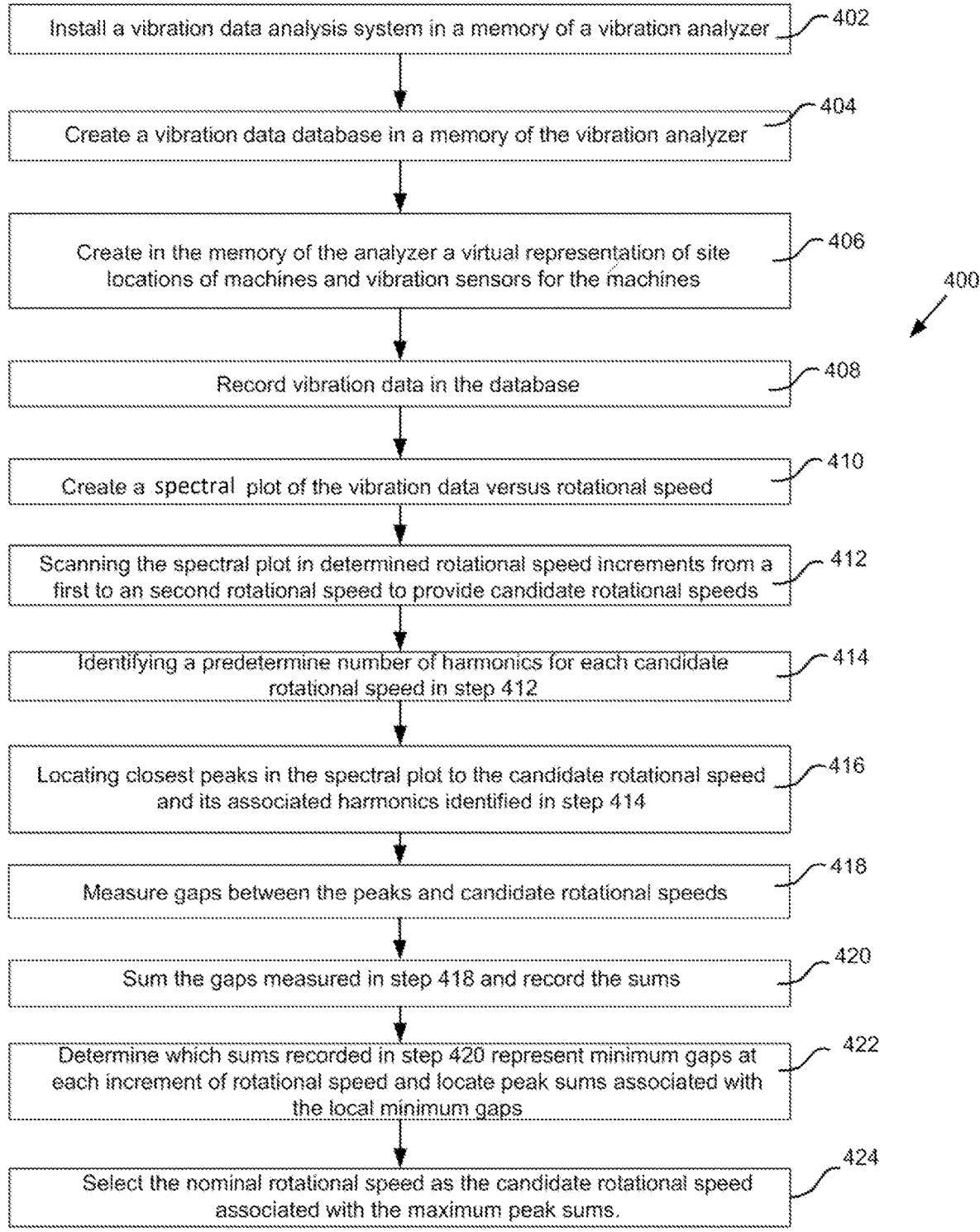
FIG. 5 is a block diagram of steps of collecting and using vibrational data using an apparatus according to a second aspect of the invention.

With reference now to FIGS. 5 and 6, a procedure 400 for determining rotational speed using the vibration analyzer according to the second aspect of the invention is illustrated. Steps 402 to 420 are similar to steps 152 to 170 described above. In step 402, a vibration data analysis system is installed in the memory 114 of the vibration analyzer 100. A vibration data database is created in the memory 114 to store vibrational data in step 404, and a representation of machine 120 locations and vibration sensors 122 is created in the analyzer memory 114 in step 406. Vibration data for the machine 120 is recorded in the database in step 408 using the sensors 122. Using the recorded data, a spectral plot 500 of the data is created in step 410 as shown in FIG. 6. In the spectral plot 500, the y-axis represents the value of the sums of the gaps determined and the x-axis represents a frequency in cycles per second or a rotational speed in revolutions per minute. In step 412, the spectral plot 500 is scanned in predetermined rotational speed increments from a first rotational speed to a second rotational speed to identify candidate rotational speeds at each increment. Typically from about 6 to about 10 rotational increments are used. Next, a predetermined number of harmonics for each candidate rotational speed in step 412 is identified in step 414. In some embodiments, the number of harmonics ranges from 6 to 10. In other embodiments, the number of harmonics is defined by the user.

Peaks closest to the candidate rotational speed and its associated harmonics identified in step 414 are located in step 416 and gaps between the peaks and candidate rotational speeds are measured in step 418 and summed in step 420. The sums of the gaps are plotted as zigzag line 510 in FIG. 6 providing a number of minimum sums and peak sums. If available, a user entered rotational speed is shown by line 512 in FIG. 6. In order to determine which of the minimum sums is the actual rotational speed, peak sums at each of the rotational speed increments are summed in step 422 and plotted as line 514 on top of line 510. The rotational speed candidates having the higher peak sums are selected in step 424 as the most likely candidates for the actual rotational speed. In this case the highest peak sums are shown by the minimum associated with point 516 in FIG. 6.

While the foregoing is not an exact determination of the rotational speed, the most likely candidates taken together with detailed information about the machine 120, such as number of poles, number of gear teeth, and the like, is useful for determining the actual rotational speed of the machine 120.

Figure 7:
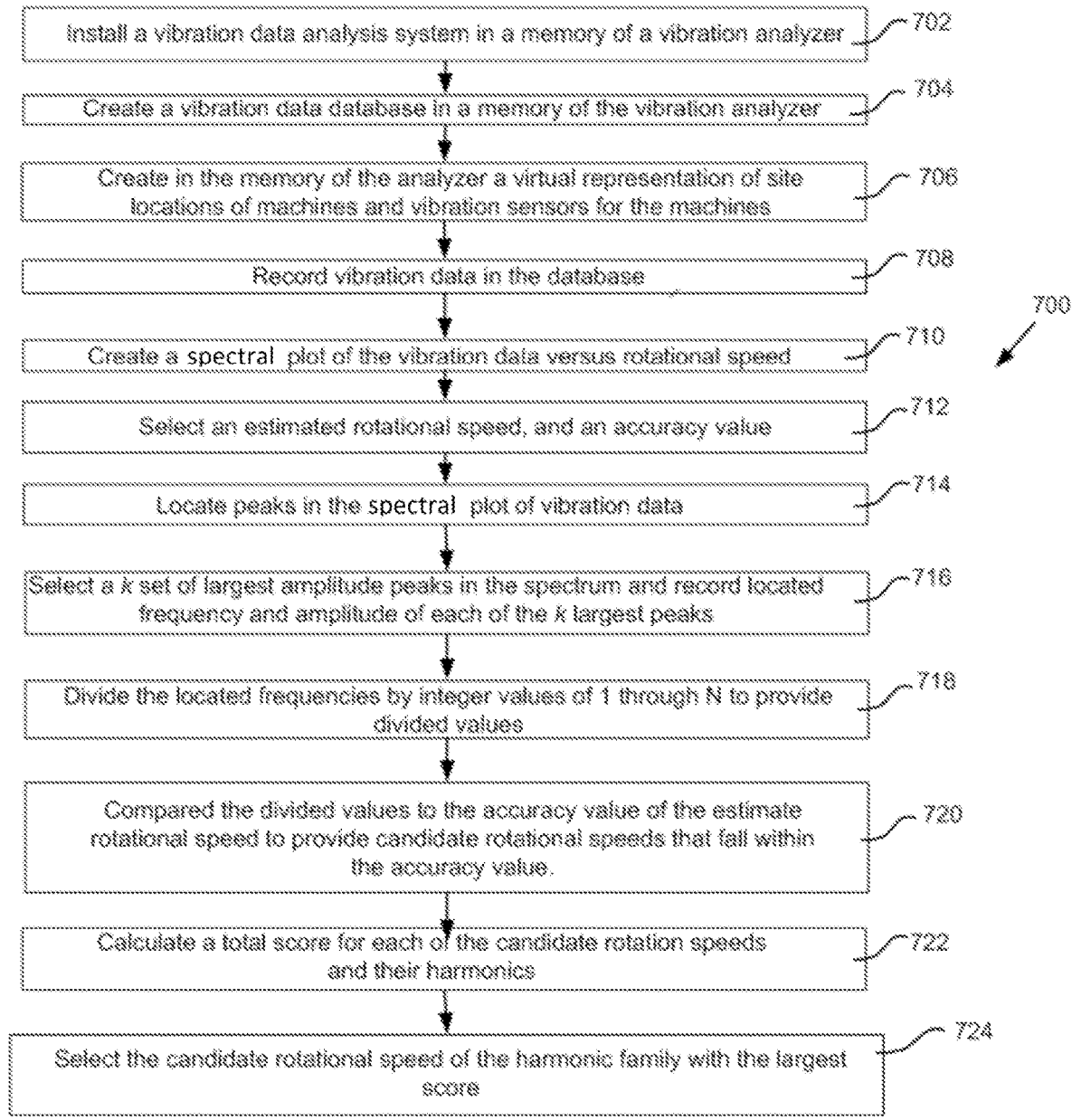
FIG. 7 is a block diagram of steps of collecting and using vibrational data using an apparatus according to the third aspect of the invention.

In the third aspect, when the rotational speed is not represented within a measured harmonic spectrum, the first two aspects of the invention may fail to identify a nominal rotational speed of the machine 120. A procedure 700 for using the analyzer according to this aspect of the invention is illustrated in FIG. 7. Steps 702-710 are similar to steps 152-160 of the first aspect of the invention and steps 402-410 of the second aspect of the invention and thus will not be repeated. In step 712, an estimated rotational speed, and an accuracy value are selected. The estimated rotational speed can come from a customer, nameplate information on the machine, or a history of similar machines operating under similar conditions. The accuracy value (% Accuracy) is user selected value and may range from about 0.5 percent to about 2 percent.

Next, the spectrum is surveyed to locate the peaks in the spectrum in step 714 by the peak location method described above. In step 716, the largest amplitude peaks of the located peaks in the spectrum are selected and the amplitude of the located largest peaks along with their associated frequencies are recorded. The number of largest peaks located in the spectrum is k wherein k ranges from 1 to K, and wherein K is input by a user and must be less than or equal to the lines of resolution of the spectrum divided by 4. The largest peaks provide the located amplitudes and associated frequencies to be considered for calculating the rotational speed. The located frequencies are divided by integer values from 1 through N in step 718 to provide divided values, wherein N is the maximum number of harmonics evaluated to find the located rotational speed. Candidate rotational speeds are designated by the divided values that fall within the accuracy value of the estimated rotational speed in step 720. Each of the candidate rotational speeds represents a harmonic family, and each candidate rotational speed and harmonic multiples thereof are scored based on their proximity to each of the largest peaks.

A total score for each harmonic family is calculated in step 722 by to the formula:

$$\text{Total Score} = 2 - (\text{Located frequency}(k)/(n*\text{candidate rotational speed}(j))),$$

wherein j the number of number of candidate rotational speeds and n is the number of harmonic families considered.

The rotational speed is selected as the candidate rotational speed with the highest score in step 724. If two or more candidate rotational speeds have the same highest score, then the candidate rotational speed family having the largest amplitude peak will produce the rotational speed.

Once the unknown rotational speed has been determined, the calculated rotational speed can be used to help analyze the test frequency spectrum, and thereby the characteristics of the machine. For example, the speed of a rotating shaft can be used with vibration information sensed from the shaft to locate problems such as unbalance, misalignment, and bearing damage. Once these problems have been diagnosed with the information, the technician can then correct the problems. Thus, the method of determining rotational speed as described is an important step in detecting, analyzing, and fixing problems with rotating equipment.

While preferred embodiments of the present invention are described above, it will be appreciated by those of ordinary skill in the art that the invention is capable of numerous modifications, rearrangements and substitutions without departing from the spirit of the invention.

What is claimed is:

1. A vibration analyzer for use in determining a nominal rotational speed of a rotating shaft, comprising:
    an input for sensing vibrational signal data at an unknown rotational speed of the shaft;
    a memory for storing the vibrational signal data; and
    a processor that executes instructions for:
        producing a spectral plot of the vibrational data,
        locating peaks in the spectral plot,
        scanning the spectral plot in predetermined rotational speed increments beginning at a first rotational speed and ending at a second rotational speed to provide a candidate rotational speed at each increment, and for each candidate rotational speed:
            identifying a predetermined number of associated harmonics,
            locating closest peaks in the spectral plot to the candidate rotational speed and its associated harmonics,
            measuring gaps between the located closest peaks and the candidate rotational speed, and
            recording a sum of the gaps,
        identifying one or more sums of the gaps that represent one or more local minimum gaps,
        summing peak sums associated with the one or more local minimum gaps, and
        selecting the candidate rotational speed that is associated with a maximum peak sum as the nominal rotational speed.

2. The vibration analyzer of claim 1, wherein the first rotational speed is a rotational speed adjacent a beginning of the spectral plot.

3. The vibration analyzer of claim 1, wherein the second rotational speed ranges from about ⅕ to about 1/10 of a total rotational speed range of the spectral plot.

4. The vibration analyzer of claim 1, wherein the input for sensing vibrational signal data is a vibration sensor.

5. The vibration analyzer of claim 1, wherein the predetermined rotational speed increments range from about 1/10 to about 1/100 of a span of the rotational speeds from the first rotational speed to the second rotational speed.

* * * * *